April 12, 1927.   W. M. HAMMERSLEY   1,624,236
VEHICLE SIGNAL
Filed Dec. 3, 1925   2 Sheets-Sheet 1
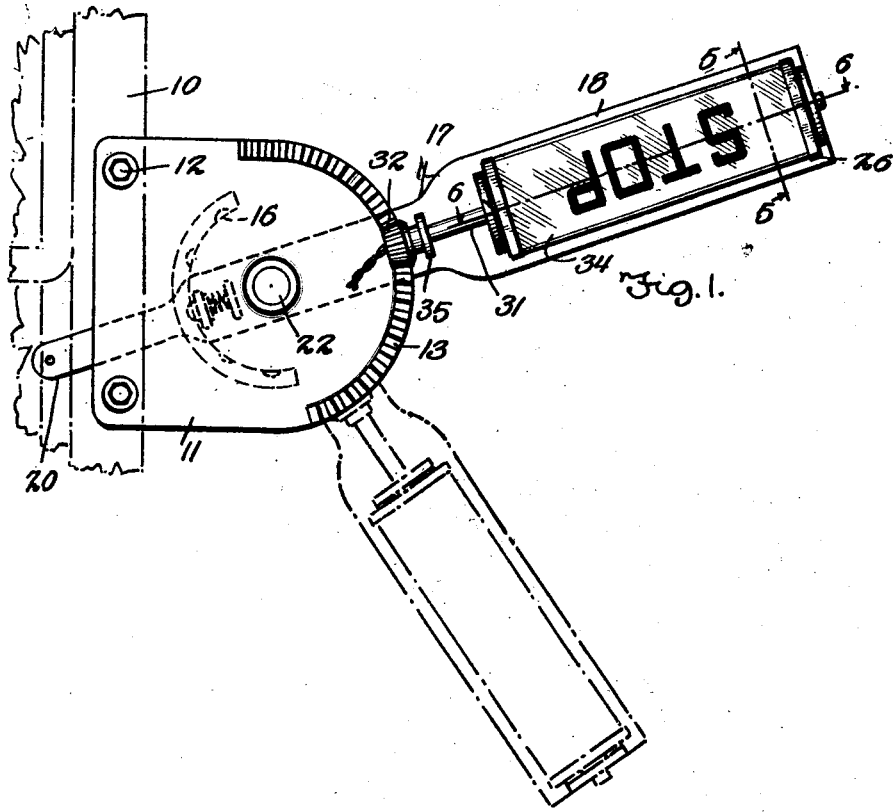
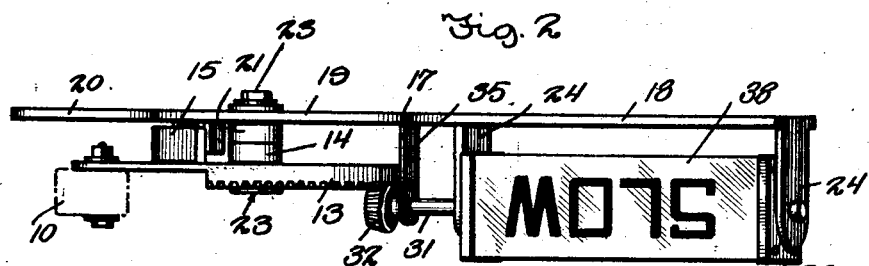
Walter M. Hammersley, Inventor
Witnesses
C. E. Churchman Jr.
E. A. Block
By Richard B. Owen
Attorney April 12, 1927.  W. M. HAMMERSLEY  1,624,236
VEHICLE SIGNAL
Filed Dec. 3, 1925  2 Sheets-Sheet 2
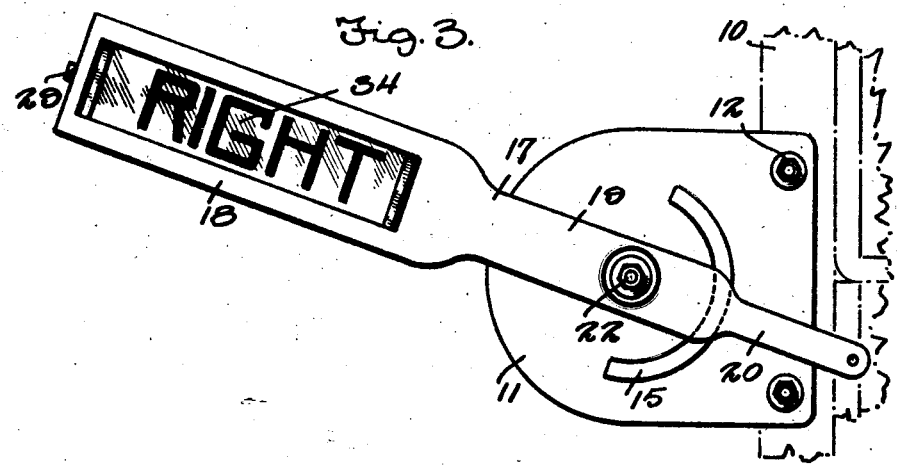
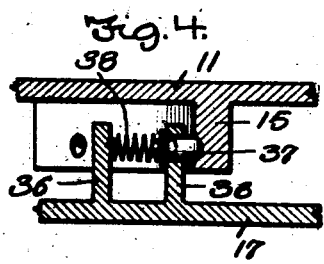
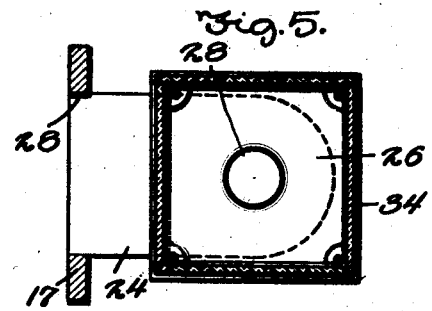
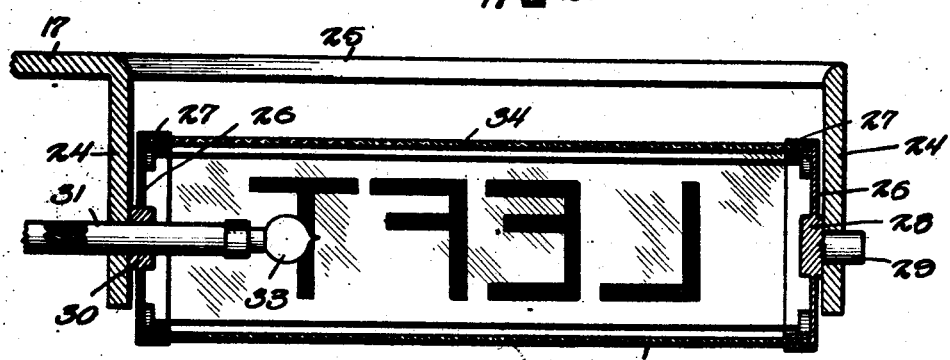
Walter M. Hammersley, Inventor
Witnesses Patented Apr. 12, 1927.

1,624,236

UNITED STATES PATENT OFFICE.

WALTER M. HAMMERSLEY, OF DAYTON, OHIO.

VEHICLE SIGNAL.

Application filed December 3, 1925. Serial No. 73,008.

This invention relates to improvements in signal apparatus and has particular reference to a signal adapted to be mounted on automobiles and similar vehicles.

An important object of the invention is to provide a durable and compact signal apparatus arranged to be conveniently operated by the driver of the vehicle.

A further object of the invention is the provision of a signal of the above character designed to be operated so as to be readily visible to following vehicles and thus indicate the direction or movement of the vehicle upon which the signal is mounted.

A still further object of the invention is the provision of a signal adapted to be mounted in a suitable position on a vehicle so as to clearly indicate the intention of the operator as to procedure and direction.

A still further object of the invention is the provision of a signal apparatus of the above type which is of a simple construction and designed to be easily operated, and arranged to be constructed and attached at a very reasonable cost.

Other objects and advantages of the invention will become apparent as the description progresses.

In the accompanying drawings forming a part of this specification and in which like numerals are employed to designate corresponding parts throughout the same;

Figure 1 is a front elevational view of a signal apparatus constructed in accordance with my invention shown in operative position on a fragmentary portion of a vehicle, Figure 2 is a top plan view of the same, Figure 3 is a rear elevational view of the same, Figure 4 is an enlarged fragmentary sectional view illustrating the construction of the stop mechanism, Figure 5 is an enlarged transverse sectional view taken on the line 5—5 of Figure 1, and Figure 6 is a longitudinal sectional view taken on the line 6—6 of Figure 1.

In the drawings, wherein for the purpose of illustration is shown the preferred embodiment of my invention, the numeral 10 generally designates a fragmentary portion of an automobile construction embodying particularly a portion of the windshield frame. Although my improved signal apparatus may be mounted in any suitable position upon the vehicle, I consider it preferable to connect the same in the relative position on the windshield frame indicated in Figures 1 and 3 of the drawings.

Referring now more particularly to the structure embodying my invention, the numeral 11 designates the supporting plate of my apparatus, this plate being substantially rectangular in formation and having its outer projecting edge rounded. The inner edge of the plate 11 is provided with openings adjacent the upper and lower edges to permit connection with the windshield frame through the medium of bolts 12. The outer rounded end of the plate is provided with a laterally extending flange having teeth formed at its outer projecting edge to provide a toothed segmental gear 13, of substantially semi-circular formation. The plate is provided on its transverse center line adjacent the outer edge with a transversely extending bearing sleeve 14 projecting at each side of the plate to form a suitable shaft supporting member. The intermediate portion of the plate is provided with an inwardly extending arcuate flange 15 of generally semi-circular formation and provided at its inner peripheral edge with a plurality of spaced recesses 16, the purpose of which will become apparent as the description progresses. It is obvious, from the foregoing description that the plate 11 is secured to the inner side of the vehicle windshield frame and designed to support a suitable movable structure in the form of a signal construction.

Arranged so as to be swung in a vertical arc about the supporting plate 11 is a signal arm 17 of longitudinal metallic construction shaped to provide a series of progressively reduced sections. The outer portion of the arm 17 is shaped to provide a comparatively wide base section 18, while the intermediate portion is in the form of a somewhat reduced pivot section 19 terminating at the inner end in a still further reduced handle section 20. It is thus apparent that the arm is formed to provide a plurality of gradually diminished portions designed to be easily operated and support a changeable signal structure. The intermediate pivot section 19 is formed with a bearing sleeve 21 adapted to coincide with the sleeve 14 formed on the support plate 11, so that a transverse shaft 22 may be readily inserted through the bearings and secured by nuts 23 to hold the same against lateral displacement. It is apparent, from this construction, that the arm 17 may be readily swung in an arc about the pivot pin 22, the outer base section extending beyond the segmental gear 13 formed on the support plate while the reduced handle portion 20 is arranged adjacent the vehicle frame.

In order that a changeable signal member may be suitably supported upon the outer enlarged section of the signal arm 17, this section has a pair of laterally projecting bracket flanges 24, which may be struck out from the body portion of the section to form a longitudinal rectangular shaped opening 25 therein. The bracket flanges 24 are provided adjacent their outer extremities with a pair of aligned openings for rotatable support of the signal member.

This signal member is in the form of a rectangular shaped casing constructed of a pair of end plates 26 preferably square in formation provided about their edges with a continuous grooved flange 27. One of the end plates is provided with a central reinforcing flange 28 on the outer side of which is formed a stub shaft 29 adapted to be rotatably mounted in the opening formed in the outer bracket flange 24. The complementary end plate 26 is provided with a reinforcing hub 30 in the center of which is formed an opening arranged to align with the opening in the inner bracket flange 24 through which is inserted an actuating shaft 31. This actuating shaft is designed to be rotatably mounted in the opening formed in the inner bracket flange and is secured to the inner casing plate 26 by a key or in any suitable manner. This shaft is preferably of tubular construction and carries on its inner end a beveled pinion gear 32 adapted to be in engagement with the segmental gear 13 for rotatable movement of the signal casing. The outer extremity of the shaft 31 projects substantially into the interior of the casing and is provided with a suitable socket designed to detachably engage an electric light lamp 33.

With particular reference to Figure 6 of the drawings, it will be noted that the signal casing is enclosed by a plurality, in the present instances, four longitudinal plates 34, the ends thereof engaging the grooved flanges 27 of the casing end plates. These casing side plates are preferably formed of transparent material, such as glass or the like and preferably of various colors, so as to distinguish the signals and also to conform to the regulations of the state traffic laws. Each of the casing side plates 34 is marked with a traffic signal, the present embodiment embodying plates bearing the words "Right," "Left," "Slow" and "Stop," so that the procedure of the vehicle will be indicated to adjacent traffic.

Referring particularly to Figures 1 and 2 of the drawings, it will be noted that the tubular shaft 31 is supported adjacent its connection with the gear 32, by an arm 35 projecting laterally from the signal arm 17 and having an opening adjacent its outer extremity so as to rotatably support the shaft and retain the pinion gear 32 in mesh with the segmental gear 13 at all times.

In use, it is evident that my improved signal structure has been shown secured to the inner side of the vehicle windshield frame so that the reduced handle portion 20 of the signal arm will be disposed in a position adjacent the driver. The signal may be operated by grasping the handle and moving the signal arm to the desired position, or if found more advantageous, any desirable structure may be associated with the signal arm to operate the same by foot movement.

From the foregoing description and the drawings, it is obvious that upward or downward swinging movement of the handle 20 will cause corresponding movement of the outer projecting portion of the signal arm 17. During the swinging movement of the signal arm the signal casing will be rotated by the engagement of the pinion and segmental gears so as to display at certain positions the various signal instructions.

At certain angular positions the swinging movement of the signal arm is arrested to display a particular signal. This is accomplished by means of the structure carried by the signal arm, embodying a pair of spaced laterally extending bars 36, arranged in parallel positions adjacent the arcuate flange 15 mounted on the support plate. The inner bar is provided with an opening adapted to slidably support a lug 37 the outer extremity of which is rounded for slidable engagement with the inner peripheral edge of the flange 15 while the opposite lug is adapted to support a compression spring 38 secured to the lug 37 and normally urging the same frictionally against the flange 15. At certain periods during the swinging movement of the signal arm the lug 37 will engage the spaced depressions formed in the flange 15 and tend to retain the signal arm in an angular position corresponding to the position of the depression. Thus, it is readily evident, that when the lug 37 engages a particularly situated depression, a certain signal is displayed, as for instance, with reference to Figure 3, the third recess or depression from the upper end of the flange 15 will indicate that the operator of the vehicle intends to make a right hand turn. Likewise, the next position of the signal will display the adjacent plate 34 bearing the word "Left" to designate the intention of making a left hand turn. When the signal assumes a downward angular position the signal casing will display the words "Stop" and "Slow" in adjacent positions so as to warn vehicles in the rear of the driver that he intends to slow down or come to a complete stop. Attention is particularly invited to the fact that the arcuate flange 15 is provided with five depressions, as disclosed in Figure 1 of the drawings, the lower depression being arranged to retain the signal arm in an upwardly directed vertical position to be employed as a parking light at night, while the other four positions will display the direction signals.

It is to be understood that the form of my invention herewith shown and described is to be taken as the preferred example of the same, and that various changes as to the shape, size and arrangement of parts may be resorted to without departing from the spirit of the invention, or the scope of the subjoined claims.

Having thus described my invention, I claim:

1. A signal comprising a support plate, means for securing the plate upon a vehicle body, a signal arm pivotally connected upon the plate and arranged to swing in a vertical arc, a rotatable signal casing carried by the outer projecting portion of the arm, signal plates mounted on the casing arranged to display various signals at various positions of the arm, means formed on the plate and casing for operating the casing, and a spring urged lug secured to the arm engageable with an arcuate flange mounted on the plate adapted to retain the arm at various angular positions.

2. A signal comprising a support plate, a segmental gear formed on the outer edge of the plate, means for securing the plate upon a vehicle, a signal arm having an enlarged outwardly projecting portion having a longitudinal opening therein, an inner reduced handle portion, means for pivotally mounting the arm on the said support plate, a signal casing rotatably mounted on the outer projecting portion of the arm including a plurality of signal plates, an arcuate laterally extending flange formed on the support plate, a spring pressed lug carried by the intermediate portion of the arm frictionally engageable with the flange and adapted to engage suitable recesses formed in the flange for retaining the signal arm at various angular positions, and means carried by the casing engageable with the segmental gear for rotatably actuating the signal casing during swinging movement of the arm.

3. A vehicle signal comprising a support plate adapted to be secured to the side of the vehicle and extending laterally therefrom, a segmental gear formed on the outer edge of the support plate, a longitudinal signal arm pivotally connected adjacent its inner end with the support plate and adapted to be swung vertically thereabout, laterally extending bearing brackets formed on the outer portion of the signal arm formed with aligned openings, a shaft extending through the opening adapted for rotary movement, a gear fixed on the inner end of the shaft adapted to mesh with the segmental gear formed on the support plate, a signal casing secured to the outer portion of the shaft between the bracket flanges rotatable with the shaft during the swinging movement of the arm, a handle formed on the inner end of the signal arm for swinging the same, an arcuate flange formed on the support plate and extending laterally thereof, the said flange being formed with spaced recesses, and a spring urged lug carried by the inner end of the swinging arm adapted to contact with the arcuate flange and periodically engage the recesses therein to releasably lock the swinging arm in signalling position.

In testimony whereof I affix my signature.

WALTER M. HAMMERSLEY.